United States Patent [19]

Grant

[11] Patent Number: 4,764,958

[45] Date of Patent: Aug. 16, 1988

[54] TELEPHONE MAGNIFIER ATTACHMENT

[76] Inventor: Alan H. Grant, 3208 Woodhollow Dr., Chevy Chase, Md. 20815

[21] Appl. No.: 15,065

[22] Filed: Feb. 17, 1987

[51] Int. Cl.⁴ .......................... H04R 1/21; G02B 7/02
[52] U.S. Cl. .................................. 379/450; 350/243; 379/441
[58] Field of Search .............. 379/450, 447, 428, 433, 379/441, 457; 350/243

[56] References Cited

U.S. PATENT DOCUMENTS

| | | | |
|---|---|---|---|
| 1,358,642 | 11/1920 | Lague | 379/447 |
| 1,508,434 | 9/1924 | Ayres | 379/447 |
| 1,762,809 | 6/1930 | Bradford | 379/450 |
| 1,971,519 | 8/1934 | Bradford | 350/235 |
| 2,991,334 | 7/1961 | Wandel | 379/449 |
| 3,651,285 | 3/1972 | Tomaiuolo | 379/447 |
| 4,354,063 | 10/1982 | Kuka | 379/433 |
| 4,490,586 | 12/1984 | Oliver | 379/445 |

FOREIGN PATENT DOCUMENTS

| | | | |
|---|---|---|---|
| 17479 | of 1934 | Australia | 350/243 |
| 485239 | 12/1917 | France | 379/447 |

OTHER PUBLICATIONS

"Phone Privacy", *Telephony*, Apr. 19, 1982, p.157.

Primary Examiner—Jin F. Ng
Assistant Examiner—Danita R. Byrd
Attorney, Agent, or Firm—Berman, Aisenberg & Platt

[57] ABSTRACT

An attachment for a telephone handset includes a portion which engages a groove in the handset and which may be rotated along the groove. A lens is mounted in a frame rotatably attached to the portion which engages the handset to allow the lens to be oriented for left or right handed use. A connection between the lens frame and the portion engaging in the handset includes a socket which receives flexible projections for holding the frame in any of several desired orientations. In use, a lens is positioned to provide optical assistance for an operator while simultaneously talking on the telephone.

20 Claims, 1 Drawing Sheet

TELEPHONE MAGNIFIER ATTACHMENT

THE TECHNICAL FIELD

This invention is an attachment for a handset of a telephone to provide a convenient holder for an optical aid.

BACKGROUND ART

Attachments for telephones to provide optical assistance are known. For example, U.S. Pat. No. 1,508,434 (Ayres) shows a magnifying glass for attachment to a telephone to provide assistance in reading telephone books, or the like. A wire frame engages a magnifying lens and also encircles a portion of the telephone. Similarly, U.S. Pat. Nos. 1,762,809 (Bradford) and 1,971,519 (Bradford) show magnifying lenses for being attached to a dial telephone to provide a magnified image of the dial. U.S. Pat. No. 3,651,285 (Tomaiuolo) shows an attachment for a telephone handset wherein a bracket supports a cylindrical magnifying lens for placement on a page of a telephone book to magnify a single line of the book. U.S. Pat. No. 4,354,063 (Kuka) shows a similar arrangement.

Other attachments for a telephone are known, such as the shoulder support shown in U.S. Pat. No. 2,991,334 (Wandell). This patent teaches that a magnifying lens may be a part of the shoulder support structure for assistance in reading.

SUMMARY OF THE INVENTION

The prior art structures which provide for attachment of an optical aid, such as magnifying lens, to a telephone do not permit use of the magnifying lens while simultaneously using the telephone. Generally, the orientation of the magnifying lens with respect to the telephone, or the handset of the telephone, is such that the lens must be oriented by placing the telephone in a position which makes it virtually unusable.

In accordance with the invention, attachment is provided wherein the lens may be used while the telephone is also used. This result is obtained by providing a bracket which engages a telephone handset in an adjustable fashion and by securing a lens frame to the bracket in an adjustable receptacle. The lens frame may be twisted with respect to the bracket so that a user may look through the lens while holding the telephone in an operational position, and the orientation may be adjusted to accommodate holding the telephone handset in either the left or right hand.

An object of this invention is to provide an optical aid for use with a telephone handset.

Another object of this invention is to provide a bracket for attachment to a telephone which is adjustable to allow a user of the telephone to look through an optical aid.

Still another object of this invention is to provide an adjustable frame for a lens wherein any of several orientations may be easily selected.

DETAILED DESCRIPTION OF THE INVENTION

Figure 1:
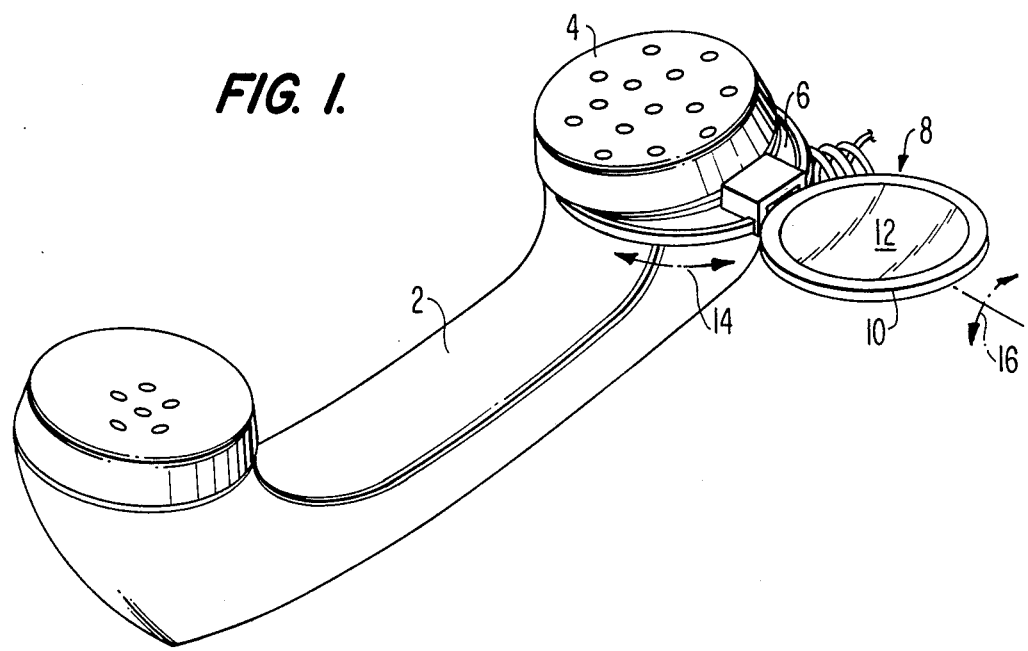
FIG. 1 is a perspective view of a telephone handset having a preferred embodiment of the invention attached.

With reference to FIG. 1, a known handset 2 of a telephone includes a mouthpiece 4 having an engagement means 6 attached thereto. Secured to engagement means 6 is an article 8 which includes a frame 10 having a lens 12 therein. As will be explained more fully below, engagement means 6 may be moved around mouthpiece 4 as illustrated by arrows 14, and article 8 may be rotated with respect to engagement means 6 as illustrated by arrows 16.

Figure 2:
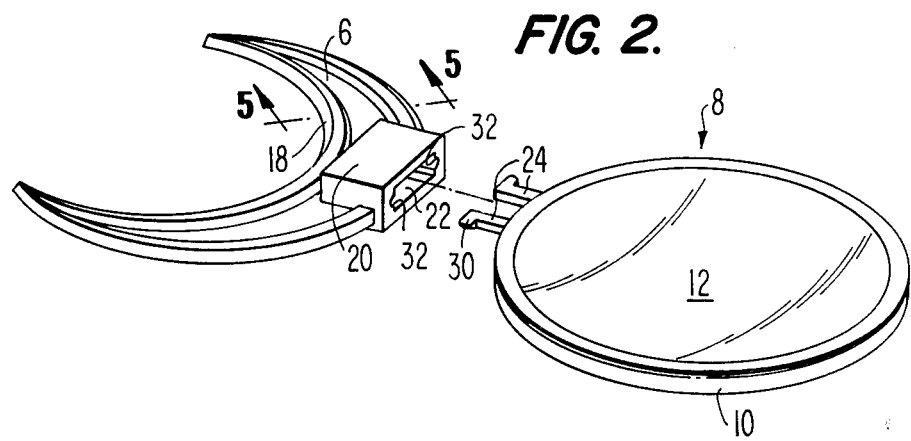
FIG. 2 is an exploded diagram of a preferred embodiment of the invention.

Referring now to FIG. 2, an exploded view of a preferred embodiment of the invention is shown. Engagement means 6 includes an inner surface 18 which is a wedge formed into an arc. The cross sectional shape of the wedge is shown in more detail in FIG. 5, which is a cross section taken along line 5—5 of FIG. 2. The wedge-shaped arc 18 extends over approximately one-half of a circle, but may be slightly more or slightly less. The wedge is designed to be received in a groove formed in a typical telephone handset between the handset body and the mouthpiece 4.

A socket 20 includes a portion having an opening 22 for receiving flexible projections 24 on article 8. Flexible projections 24 may be bent inwardly slightly during insertion into opening 22. Article 8 includes the frame 10 which supports lens 12.

Figure 3:
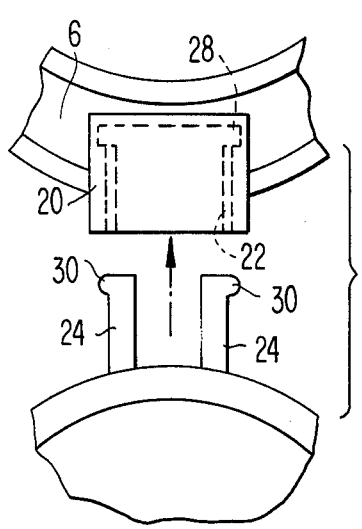
FIG. 3 is a plan view of a portion of the embodiment shown in FIG. 2 at an enlarged scale.

As shown in FIG. 3, opening 22 includes a slot 28 at its bottom. When projections 24 are inserted into opening 22, retaining tips 30 which extend outwardly from the flexible projections will engage slot 28 to prevent removal of the flexible projections while permitting rotation as shown by arrows 16 of FIG. 1.

Figure 4:
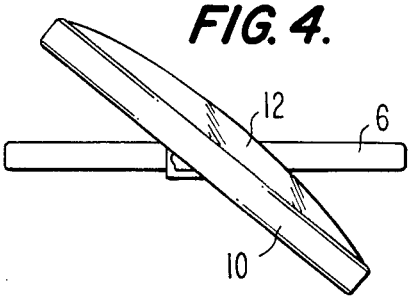
FIG. 4 is a top view of an assembled apparatus shown in FIG. 2.

FIG. 4 illustrates one operational orientation of frame 10 and lens 12. In this orientation, lens 12 has been rotated with respect to engagement means 6 by approximately 40°. In this orientation, a user of handsheet 2 can easily view a desired object through lens 12 while simultaneously talking on the telephone. The orientation of FIG. 4 is useful when the handset is held in the right hand, and it will be appreciated that rotation of frame means 10 by approximately 80° provides an orientation useful when holding the handset in the left hand. Rotation of frame 10 by approximately 40° to be aligned with engagement means 6, as shown in FIG. 1, is useful if the lens is to be used without talking on the telephone. In the orientation shown in FIG. 1, the handset may be used as a handle for aligning the lens 12 with an object to be viewed.

With reference to FIGS. 2 and 4, opening 22 is preferably rectangular and includes detents 32 in the shorter sides of the rectangle. This arrangement permits the orientations described above which allow viewing through the lens with the handset held in either the left or right hand by rotating frame 10 until flexible projections 24 are engaged in a first pair of opposed corners of the rectangular opening 22. The dimensions of the rectangle are such that when the flexible projections are received in opposed corners, frame 10 will be rotated approximately 40° with respect to engagement means 6. Similarly, frame 10 may be rotated to engage a second pair of opposed corners in an opposite orientation. Detents 32 are engaged by flexible projections 24 when frame 10 is aligned with engagement means 6 as shown in FIG. 1. Because retaining tips 30 are engaged in slot 28, rotation of frame 10 is easily achieved without risk of its being removed from socket 20.

Figure 5:
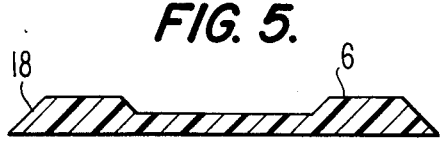
FIG. 5 is a cross section taken along line 5—5 of FIG. 2.

As noted above, arc 18 is of an angular extent sufficient to secure engagement means 6 in the groove between mouthpiece 4 and the body of handset 2. While the engagement means 6 could have an angular extent such that arc 18 is a complete circle, in a preferred embodiment, the arc is approximately a semi-circle to allow easy removal or installation of engagement means 6 on handset 2. By providing arc 18 with a wedged shape in cross section, as shown in FIG. 5, engagement means 6 is easily rotated in the above-described groove to facilitate orientation of lens 12 for left or right handed use. It will further be appreciated that the handset 2 may be replaced on a wide variety of known telephone bases without removing the inventive device.

In a preferred embodiment, lens 12 has optical power of plus two diopters and has a diameter of 65 mm. Other powers, sizes, or shapes will be apparent to those of skill in the art. For example, a positive power lens would be useful for those needing reading glasses, whereas a negative power lens would be useful for other users.

Modifications of the preferred embodiment within the scope of the following claims will be apparent to those of skill in the art.

What is claimed is:

1. An attachment for a telephone handset comprising engagement means for engaging said handset and socket means for holding an article, wherein said engagement means comprises an elongate wedge forming an arc, said socket means comprises an element forming a polygonal opening for holding said article in at least two orientations with respect to said engagement means, and said article comprises two flexible projections received in said opening.

2. An attachment according to claim 1 wherein said article is a frame for a lens.

3. An attachment according to claim 2 further comprising said lens, and wherein said lens has positive power.

4. An attachment according to claim 2 further comprising said lens, and wherein said lens has negative power.

5. An attachment according to claim 1 wherein said two flexible projections are nominally spaced by a distance substantially equal to the distance between at least two opposed corners of said polygonal opening.

6. An attachment according to claim 5 wherein said polygonal opening is rectangular.

7. An attachment according to claim 6 wherein said projections include means for retaining said projections in said opening.

8. An attachment according to claim 7 wherein said element forms a slot adjacent said opening and said means for retaining comprises outwardly directed tips for engaging said slot.

9. An attachment according to claim 8 further comprising detents in sidewalls of said opening for engaging said projections in one orientation of said article.

10. An attachment according to claim 9 wherein said article comprises a frame for a lens.

11. An attachment according to claim 10 further comprising said lens.

12. Apparatus comprising a telephone handset, engagement means engaging said telephone handset, frame means pivotally attached to said engagement means, and lens means supported by said frame means, wherein said engagement means is attached to said frame means by socket means receiving projection means therein, said socket means is fixed to said engagement means, and said projection means is fixed to said frame means.

13. Apparatus according to claim 12 wherein said projection means is adapted to be held in any of at least two orientations with respect to said socket means.

14. Apparatus according to claim 13 wherein said engagement means is movable with respect to said telephone handset.

15. Apparatus according to claim 14 wherein said engagement means is attached to a mouthpiece portion of said handset.

16. An attachment for a handset of a telephone, said handset being of the type wherein a mouthpiece cover is threadably attached to a mouthpiece portion of the handset such that a small annular gap exists between said mouthpiece portion and said mouthpiece cover, said attachment comprising engagement means for engaging said handset and optical means supported by said engagement means, said engagement means comprising an arc having a wedge-shaped inner edge for being received in said annular gap, said arc having a radius such that said engagement means is held in said gap and may be moved along said gap.

17. An attachment according to claim 16 wherein the angular extent of said arc is less than a full circle.

18. An attachment according to claim 16 further comprising socket means connecting said engagement means to said optical means, said socket means providing at least two discrete positions of said optical means with respect to said engagement means.

19. An attachment according to claim 18 wherein at least one of said positions permits a user of said handset to look through said optical means while using said handset.

20. An attachment according to claim 18 wherein one of said discrete positions permits said user to look through said optical means when said handset is used on one side of said user's head and another of said discrete positions permits said user to look through said optical means when said handset is used on the other side of said user's head.

* * * * *